Figure 3:
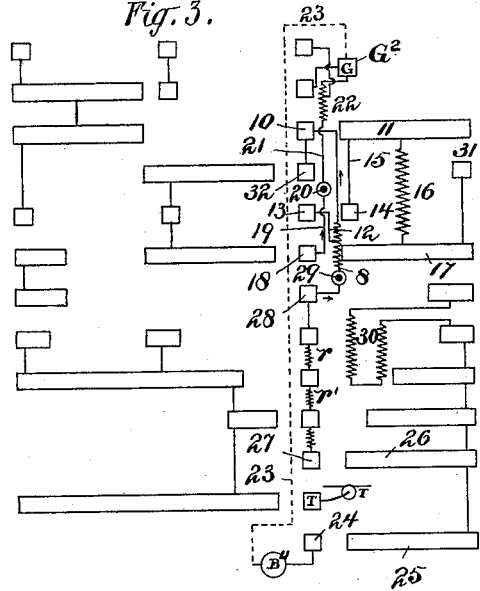

(No Model.) 2 Sheets—Sheet 1.
E. A. SPERRY.
SYSTEM OF CONTROL FOR ELECTRIC MOTORS.
No. 566,426. Patented Aug. 25, 1896.
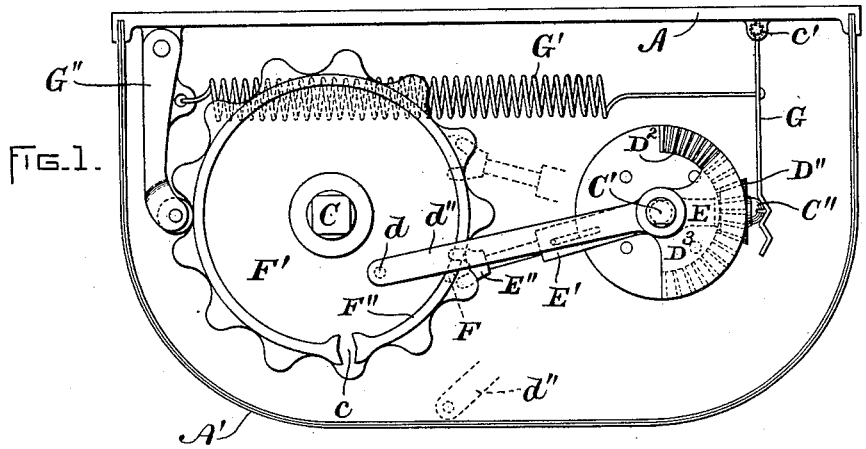
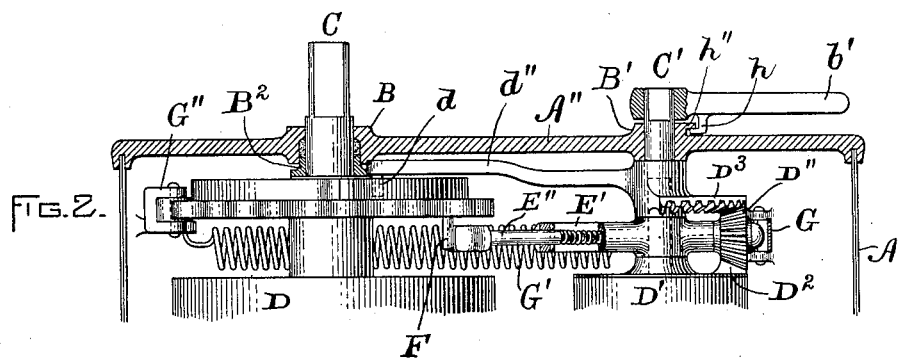
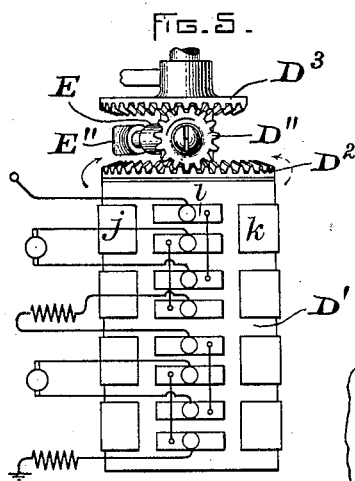
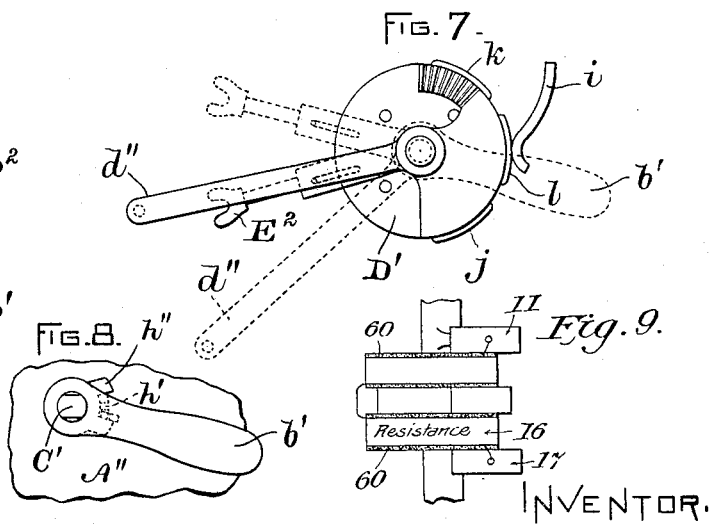
WITNESSES.
A. S. Abell.
A. F. Macdonald.
INVENTOR.
Elmer A. Sperry, by
Geo. R. Blodgett,
atty.

(No Model.) 2 Sheets—Sheet 2.

E. A. SPERRY.
SYSTEM OF CONTROL FOR ELECTRIC MOTORS.

No. 566,426. Patented Aug. 25, 1896.

Witnesses. Inventor.

UNITED STATES PATENT OFFICE.

ELMER A. SPERRY, OF CLEVELAND, OHIO, ASSIGNOR TO THE GENERAL ELECTRIC COMPANY, OF NEW YORK.

SYSTEM OF CONTROL FOR ELECTRIC MOTORS.

SPECIFICATION forming part of Letters Patent No. 566,426, dated August 25, 1896.

Application filed February 16, 1895. Serial No. 538,664. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Systems of Control for Electric Motors, of which the following is a specification.

The present invention relates to controllers which are adapted to regulate the energy supplied to motors when used for propelling a vehicle and for regulating the energy supplied to electric brakes from the motors at the time they are converted into generators.

In carrying out the present invention one set of contacts or brushes are preferably stationary and mounted in any suitable way in the controller, with circuit-wires leading therefrom to the various motors and brake-magnets. Mounted in such a manner as to be movable with respect to the contact-brushes is a commutating-switch for varying the circuit relations of the motors when used for propelling the vehicle, and a second switch, preferably supported by the same means as the first, is used for varying the circuit relations of the motors when they are converted into generators and are supplying the brake-circuit.

To reduce the amount of current in the brake side of the system, it has been found necessary to have more resistance in this side of the system than in the other. This has been accomplished by adding extra resistance and brushes which are only in circuit on the brake side; but this has been found to be objectionable, as it increases the number of contacts on the brake-switch, and consequently its length necessitates extra brushes and also increases the cost of manufacture and maintenance.

In the present invention a certain amount of resistance is placed on the vehicle in the usual way and included in circuit as desired. In addition to this an auxiliary resistance is mounted on the switch itself, and where, as in the present invention, the two switches have common supports and a common actuating device the resistance may be wound around the cylinder and insulated therefrom in any desired manner. Connected to this resistance at any suitable number of points are the contact-plates of the switch, which engage with the stationary brushes. The resistance may be made in short sections and the ends connected to contact-plates, or it may be made larger and taps taken therefrom to any number of contacts on the switch. I do not herein claim any specific way for mounting the resistance, as this is the subject of another application; but I claim, broadly, the use of a resistance which is mounted on the actuating member of a controller.

In order to do away with the extra reversing-switch, and consequently the extra brushes and contacts, used for reversing the field and armature at the time the motors are converted into generators, I utilize the main reversing-switch in such a manner that it performs a double function, namely, that of establishing such circuit relations of the motors that they will, when supplied with energy, propel the car forward or back, and the reversing of the relation of field and armature when the motors are used for braking purposes.

A handle is mounted on the outside of the controller in the usual manner, so that when thrown forward or back it will, by means of the contacts on the reversing-switch cylinder, establish the desired circuit relations. Mounted on this cylinder are extra contacts which come into play when it is desired to reverse the established relation of the circuits without removing the reversing-switch handle, in order to use the motors as generators to supply current to the brakes. Independent means are employed for establishing this new relation of circuits, this being preferably accomplished by the main actuating-handle of the controller at a period when the main circuit is broken, so as to avoid arcing at the contacts. This is accomplished by suitable means giving to the switch a reciprocating motion, so that the rows of contacts, of which there are three, are moved to and fro with respect to the single set of stationary brushes, the left-hand and center rows of contacts forming one set and the right-hand and center rows forming the other set. If the circuits are so arranged that when the brushes engage with the center row of contacts the motors propel the vehicle in one direction, then when the reversed or relatively-reversed condition is desired for the purpose of converting the motors into generators, the cylinder is rotated into a position where the contacts on the cylinder forming the other member of the pair will engage with the stationary brushes and reverse the relation of armature and field, as will be more explicitly described hereinafter.

This invention also consists in providing means for weakening the field of one of the motors, thereby permitting the other motor to preponderate for the purpose of bucking the motors. In the present application is shown mechanical means for accomplishing this object, consisting of a pair of contacts normally open and closed by a device actuated by the main or commutating switch cylinder. On the power side of the system contacts would be used for weakening the fields of both motors to increase their speed, but this would be arranged to affect both motors equally.

The invention also consists in certain details of construction more fully described and claimed hereinafter.

Figure 4:
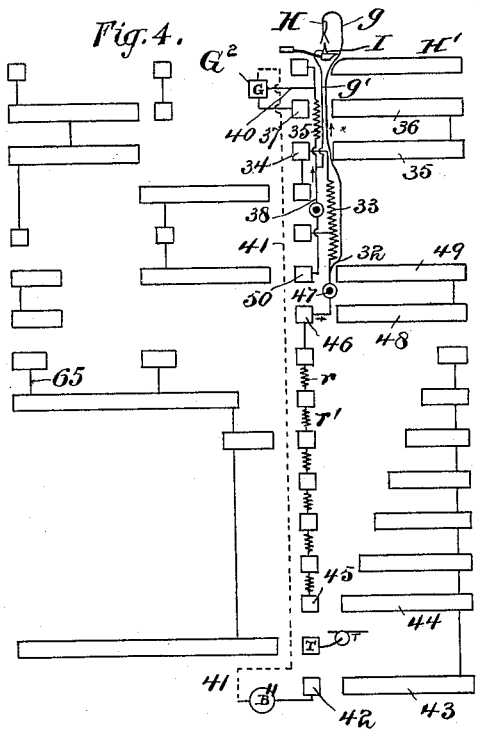
Figure 6:
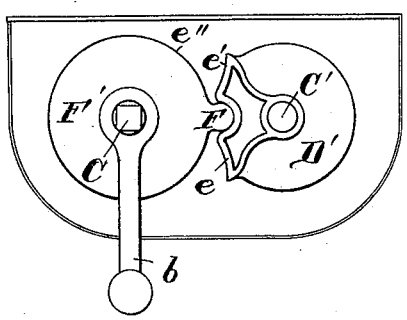

Figure 1 is a plan view of the controller with the cover removed. Fig. 2 is a side elevation of the same, partly in section. Figs. 3 and 4 are developments of the cylinders. Fig. 5 is a detail of the reversing-switch. Fig. 6 is a modification of the invention. Figs. 7 and 8 are details of the reversing-switch, and Fig. 9 is a detail of the resistance which is carried by the cylinder.

Referring now to Figs. 1, 2, &c., on the first sheet of drawings, A indicates the casing of the controller, provided with a cover $A'$, removable to give access to the controller mechanism. A top plate $A''$ is secured to the back in any desired manner, and is provided with bearings B and $B'$ for the shafts C and $C'$. A gland $B^2$, with suitable packing, is provided to keep water out of the controller-casing. The shaft C is adapted to rotate the cylinder D, the latter being provided with suitable contact-plates for varying the circuit relations of the motors.

The shaft C carries a star or friction wheel $F'$, which regulates the step-by-step motion of the controller-cylinder. The pawl $G''$, controlled by the spring $G'$, insures the cylinder D being stopped at the proper positions. On the upper surface of the star-wheel $F'$ and cast integral therewith is a flange $F''$, provided with an opening $c$ to allow the pin or roller $d$ on the end of the arm $d''$ to pass from the position shown to the one shown in dotted lines. This can only be done when the cylinder D is in the off position. The slot $c$ will then be so located that the pin $d$, swinging in the arc of a circle with the shaft $C'$ as a center, will pass through from the inside to the outside of the flange $F''$. In any other than the off position of the controller-cylinder the pin $d$ would engage with either the inner or outer periphery of the flange $F''$, thereby preventing the movement from one position to another. With the cylinder $D'$ in the off position the brushes $i$ would be midway between the rows of contacts $l$ and $k$ if the handle $b'$ was set for a forward movement of the car, and between contacts $l$ and $j$ if set for a backward movement. If now the controller-cylinder be rotated to the off position and the arm $d''$ rotated about the shaft $C'$ as a center by the handle $b'$ until the pin $d$ is located in the slot $c$ midway between the inner and outer ends, then the cylinder D is locked against further movement in either direction and the handle $b'$ can be removed from the shaft $C'$, for the lug $h$ on the under side of the handle is opposite the slot $h'$ in lug $h''$, cast on the top of the plate $A''$. The controlling-cylinder D is also in the off position, and all circuits are interrupted.

The arm $d''$, segmental gear $D^3$, and shaft $C'$ are preferably formed of one piece. In the hub of the segmental gear $D^3$ is provided a bearing for the shaft of the reversing-switch cylinder $D'$, as shown in dotted lines. Mounted on the upper end of the cylinder $D'$ is a circular rack $D^2$, with teeth corresponding to those of the segmental gear $D^3$. Working between the gear $D^3$ and the rack $D^2$ is a pinion $D''$, which is sleeved so as to revolve on a projection of the arm $E'$, and is held in position by a screw $C''$. The arm $E'$ is sleeved on the shaft of the cylinder $D'$ and moves independently. Mounted in the end of the arm $E'$ is a spring-pressed rod $E''$, provided with a fork at its outer end, which engages with a pin F on the under side of the star-wheel $F'$. As the star-wheel is reciprocated from the off position the pin F will engage with the fork in the rod $E''$ and move it, together with the arm $E'$ and pinion-gear $D''$, from the position shown to the dotted-line position, and vice versa. To give this a definite position forward or back, an arm G is pivoted at the back of the controller and provided with two notches at the end, one for the forward position, the other for the reverse. It is held in engagement with the screw $C''$ by means of the spring $G'$, which also serves to hold the pawl $G''$ in engagement with the star-wheel on the main cylinder D.

Mounted on the reversing-switch cylinder $D'$ are three rows of contacts, having any desired arrangement of cross connections. In the present instance the center row is split up into a number of small contacts, the first and third contacts forming one pair, the second and fourth a second pair, and so on. The brushes $i$ are arranged in a vertical line and are adapted to engage with the center and right-hand rows of contacts in one position of the reversing-switch and with the center and left-hand rows in the other position.

The action of the controller will now be described. Assuming the arm $d''$ to be in the position shown, the motors will be so connected that they will propel the car backward. The reversing-switch handle $b'$ being in the position shown in Fig. 7, thrown back toward the motorman, indicates a backward movement of the car, while the forward position, away from the motorman, indicates a forward movement of the car. The handle $b'$, having been rotated to the position shown, has established the relation between the segmental gear $D^3$ and the rack $D^2$. (Shown in Fig. 5.)

If the main controller-cylinder D is rotated in either direction from the off position, the pin F on the under side of the star-wheel will move the arm $E''$ from the center into either of the positions shown in Fig. 1. The arm $d''$ and gear $D^3$ remaining stationary, motion is imparted to reversing-switch cylinder $D'$ by means of the pinion $D''$. Assuming that the rod $E''$ is moved from a central position to the one shown in full lines, this will cause the pinion-gear $D''$ to rotate in the direction of the arrow, causing the cylinder $D'$ to rotate to the position shown in Fig. 5. If the rod $E''$, however, were rotated from the center or off position to that indicated by dotted lines, the gear $D^3$ still remaining stationary, motion would be transmitted to the cylinder $D'$ by means of the pinion-gear $D''$ and the rack $D^2$, as before, but the direction of revolution would be that shown by the dotted arrow, which is opposite to the first one. The brushes $i$ are now in engagement with the contacts in the vertical row $j$, and the relation between armature and field has been changed. If now the controller is brought to the off position and the reversing-switch handle $b'$ is moved to the forward position, the arm $d''$ would occupy the position shown in dotted lines in Fig. 7, and the cylinder $D'$ would be shifted so that the brushes $i$ would be adapted to work on contacts $l$ or $k$, and half-way between the two would be the off position of the reversing-switch.

The rod $E''$, being independent of any movement of the arm $d''$ and segmental gear, is free to move forward and back as before, the only difference being that the relative reversed condition has been changed; that is to say, the contacts $l$ and $j$ no longer form the reversing-switch for the motors, as the cylinder $D'$ has been shifted to a position where either of the contacts $l$ and $k$ is engaged by the row of brushes $i$.

The reversing-switch handle $b'$ determines in all cases whether the brushes $i$ shall engage with contacts $j$ and $l$ or $l$ and $k$ in their two positions, and the rod $E''$, being independent of the handle $b'$ and actuated by means of the main controller-cylinder, is free to shift the relation of armature and field relative to that established by the main reversing-switch handle. This is a combination of two reversing-switches. One switch establishes circuit relations which determine the direction in which the car shall travel and the other switch shifts the connections thus established to a condition so that the motors may act as generators and suppy energy to the brake-magnets.

Each time the controller is brought to the off position the circuit is interrupted at the controller in the usual way, and also at each brush on the reversing-switch, for every time the controller is brought to the off position, whether it has been used to regulate the current supplied to the brake-magnets or to regulate the motors, the reversing-switch cylinder is automatically thrown to a position which opens the circuit through the brushes and leaves them idle between two sets of contacts.

The contacts in Figs. 3 and 4 to the left of the central row of contacts are those of the ordinary series-parallel combination for two motors, but the arrangement of the contacts to the right in each of these figures is different, that in Fig. 3 being a series and that in Fig. 4 a parallel arrangement of the motors, with an additional device (indicated at H) for coupling in an equalizing-wire $g$ for the purposes of equalizing the potential of the two motors when used as generators in parallel-circuit relation. This is effected by allowing the slide $H'$ to press the contact I up into connection with the contact H and allowing it to fall away when the circuit connections are broken, which is the condition shown in the diagrams.

The circuit relations on the motor side being well known, no special reference will be made to them herein, except relatively to the contacts on the generator side, now to be described.

Assume the current to emanate at point 8, Fig. 3, flowing upward in the figure through the field upon the first closure of the circuits on the generator side, it will be seen that the currents flow in the direction of the arrow out by contact 10 to plate 11, a portion of the field being shunted by wire 12, contact 13, and plate 14, connected to plate 11 by wire 15. This current flows down through the resistance 16 to plate 17, thence to contact 18, wire 19, as indicated by the arrow, to commutator 20 of the second motor, wire 21, field 22 to the ground at $G^2$, thence through the ground or dotted wire 23, the brake-magnet $B''$, contact 24, plate 25, plate 26, contact 27, the three sections of resistance to contact 28, commutator 29 of the first motor to the starting-point. It will be seen that by moving the plates toward the contacts or vice versa the resistances between 27 and 28 will be successively cut out. Then the resistance 30 will be cut out, and, lastly, by the coöperation of plate 31 with contact 32, the resistance 16 will be finally removed and the generators will then act on a closed short circuit. The resistances 30 and 16 are mounted on the cylinder with the plates, while the other resistances connected to the contact-brushes are separately mounted, so that the rheostat as a whole consists of two divisions, one of which, together with its terminal plates, moves with reference to the other division. The resistances 16 and 30 are suitably mounted in the cylinder and insulated therefrom, connections being made to suitable contact-plates. By this construction I am enabled to do away with a number of the contact plates and brushes, and by inserting this resistance where it is only used for a short time no trouble is caused by heating.

It will be seen that the trolley-contact T is broken during the operation of the brakes, and that the field of one motor is cut out or weakened at the beginning or time of first closure of the circuit.

Referring now to the generator side of the diagram in Fig. 4, the circuit is as follows: The current emanating at commutator-brush 32 flows upward through the field 33 to contact 34, plates 35 and 36, contact 37, to ground $G^2$. The current in the other motor emanating at commutator-brush 38 flows in the direction of the arrow through field 35 direct to ground by wire 40. These currents unite at this point and flow by wire 41 (shown in dotted line) to brake-magnet B″, contact 42, plates 43 and 44, contacts 45, through all the resistances to contact 46, where it divides, part going to the commutator 47 and to the starting-point of one motor, the other passing through plates 48 and 49 to contact 50, to commutator, and to commutator-brush 38, the point of starting of the second motor. By further relative movement in the same direction of the contacts and plates the resistance is gradually cut out until the generators are coupled directly to the brake-coil with no intervening resistance. The equalizing-wires $g$ and $g'$, it will be seen, couple the two generators at similar points in each, namely, the commutator-brush between the commutator and field in each. From the length and position of the plate H′ it will be seen that this coupling is automatically effected when the motors are operated as generators only, being open-circuited when used as motors. The connection to the source of current-supply T is open-circuited upon the generator side.

A desirable feature of the present invention consists in the means for introducing automatically an extra amount of resistance at the time when such motors are being utilized as generators, and again automatically dispensing with the use of the extra resistance whenever the motors are again employed in their normal capacity, and, further, this portion of the invention has special relation to the employment of a plurality of motors, especially where such motors are employed in various combinations, in series or parallel, to give various speeds or torques.

Figs. 1 and 2 show means for changing or reversing the circuit relations of the elements of the motors whenever the circuit relation of the central row of contacts is being shifted from one to the other of the sets of contact-plates shown in Figs. 3 and 4 as lying to the left and right. To make this action clear, it may be assumed that the car is running forward with the motors in parallel, which assumes that the row of contacts stand in a position to the extreme left in either Figs. 3 or 4.

The cylinder D, which will be assumed to carry both sets of contacts, will, when rotated by handle $b$, connect the motors in series relation. Then two steps of resistance $r$ and $r'$ are introduced, and upon further movement of the handle the circuit is interrupted entirely, the handle standing now in its off position with the contacts in the relations shown in Figs. 3 and 4. A further movement of the handle in the same direction first reverses the position of the cylinder D′, and therefore the elements of the motors, thereby converting them into generators capable of producing current by their forward motion. In the case of Fig. 3, however, one of these motors at the start is crippled by the coöperation of the contacts 13 and 14, operating upon one of the fields, as described, giving the other motor preponderance of electromotive force for the purpose of bucking the motors, the current so generated being led through any translating device or devices, such, for instance, as the brake-magnet B″; and upon further movement of the handle in the same direction various steps, five in number, of artificial resistance are cut out, enabling the operator to control the operation of the brake or currents generated at will. After the operation has been completed and the contacts are in a position to the extreme right upon the contact-plates in Figs. 3 and 4 a reverse movement of the handle will first cut in the various steps of resistance and then open-circuit the generator side, and the contacts will be in the relation shown in the figures. The reverse-cylinder D′ will be in the process of turning from the generator relation to the motor relation, which will be completed if the motion of the handle be continued and the series-parallel relation of the motors and their connections with the source of electrical supply be again established, and the motors will run in a direction determined by the position of the handle $b'$, as fully set forth.

Fig. 9 is a detail view of the resistance carried by the cylinder, in which D is the cylinder, provided with contacts 11 and 17, to which are secured the leads from the resistance 16. The resistance is wound directly on the cylinder, suitably insulated therefrom and from the contacts by insulation 60. The resistance 30 is wound on the cylinder in the same manner and connected to similar contacts.

Having described my invention, what I claim is—

1. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, in combination with means for changing the relative reversed condition of the motor or motors when connected to one or another of the circuits.

2. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, means for changing the relative reversed condition of the motor or motors when connected to one or another of the exterior circuits, in combination with a mechanical coupling between the means and the operating mechanism.

3. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, in combination with means for changing the relative reversed condition of the motor or motors when connected to one or another of the circuits, and a locking device for the said means.

4. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making such change, in combination with means for changing the relative reversed condition of the motor or motors when connected to one or another of the circuits, and a locking device for the means, operative when the moving element of the controller is in certain only of its positions.

5. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, in combination with means for changing the relative reversed condition of the motor or motors when connected to one or another of the circuits, and a locking device for the means, operative when the main moving element of the controller is so moved that one of the circuits is coupled with the motor or motors.

6. In an electric controller, a main moving element, a motor or motors connected thereto, a reversing-switch, power and brake circuits for the motor or motors, the main moving element organized to change the connections of the motor or motors from one to another of the circuits, mechanism for operating the reversing-switch at the time of making the change, in combination with means for changing the relative reversed condition of the motor or motors when connected to one or another of the circuits, and a locking device for the main moving element of the controller operated by the said means.

7. In an electric controller, a moving element, a motor or motors connected thereto, a reversing-switch, power and brake circuits for the motor or motors, the moving element organized to change the connections of the motor or motors from one to another of the outside circuits, a removable operating-handle for operating the reversing-switch at the time of making the change, means for changing the relative reversed condition of the motor or motors when connected to one or another of the circuits, in combination with a device for retaining the handle of the reversing-switch when in certain of its positions.

8. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, in combination with means for changing the relative reversed condition of the motor or motors when connected to one or another of the circuits, and a retaining device for the said means.

9. In a controller for an electric machine or machines, power and brake circuits adapted to be connected to the electric machine or machines, a sectional resistance leading to the controller, in combination with means for rendering a portion of the sections inoperative whenever the machine or machines are coupled to one of the circuits.

10. In an electric controller, a moving element, a motor or motors connected thereto, a reversing-switch, power and brake circuits for the motor or motors, the moving element organized to change the connections of the motor or motors from one to another of the circuits, mechanism for operating the reversing-switch at the time of making the change, in combination with means for changing the relative reversed condition of the motor or motors when connected to one or another of the circuits, and a retaining device for the said means, a sectional resistance, and means for rendering all of the sections operative when coupled with one of the circuits.

11. In a controller for an electric machine or machines, three or more sets of coöperating contacts mounted for relative movement and for successive engagement, a sectional resistance leading to such contacts, in combination with means for rendering a portion of said sections inoperative whenever one of said sets is so engaged.

12. In a controller for an electric machine or machines, three or more sets of coöperating contacts mounted for relative movement and for successive engagement, a sectional resistance leading to such contacts, in combination with means for rendering a portion of said sections inoperative whenever one of said sets is so engaged, and means for rendering all of such sections operative when another of said sets is engaged.

13. In a controller for an electric machine or machines, a moving element, moving and stationary coöperating contacts, electrical resistance in sections coupled to the stationary contacts, in combination with a separate resistance section or sections mounted upon the said moving element of the controller and circuit connections therefrom to the contacts.

14. In a controller for an electric machine or machines, exterior circuit connections leading to said controller, a sectional resistance also leading to the controller for connection with the said electric machine or machines, means whereby said resistance is coupled to such machine or machines when certain combinations of exterior circuits exist, in combination with a separate resistance carried by the controller-cylinder and means whereby such separate resistance is connected to such machine or machines when other combinations of exterior circuits exist.

15. In an electric controller, a plurality of electric machines, power and brake circuits adapted to be connected to the electric machines, a sectional resistance leading to the controller, in combination with means for rendering a portion of the sections inoperative whenever the machines are coupled to the power side of the system.

16. In an electric controller, a plurality of electric machines, power and brake circuits adapted to be connected with the electric machines, means connected with the controller whereby each of the circuits is connected to one or more of the electric machines in successive steps, a sectional resistance leading to the controller, contacts within the controller for the resistance-sections, in combination with a dissimilar number of coöperating steps for the resistance-contacts when coupled to the power and brake circuits.

17. In an electric controller, a plurality of electric machines connected therewith, power and brake circuits coöperating with separate sets of controller-contacts, in combination with a series-parallel arrangement of the contacts or sets of contacts engaging with one of the circuits.

18. In an electric controller, a plurality of electric machines connected therewith, power and brake circuits coöperating with separate sets of controller-contacts, in combination with a series-parallel arrangement of the contacts or sets of contacts of one of the circuits, and a continuous circuit relation of the contacts of the other.

19. In an electric controller, a plurality of electric machines connected therewith, power and brake circuits coöperating with separate sets of controller-contacts, a series-parallel arrangement of the contacts or sets of contacts of one of the circuits, a sectional resistance leading to the controller, in combination with means for rendering a portion of the sections inoperative whenever the series-parallel set of contacts is coupled to the machines.

20. In an electric controller, two sets of contacts, a plurality of electric machines connected therewith, an equalizing connection as $g$ leading from the machines, in combination with means whereby the said equalizing-circuit is normally open-circuited, while one of the said sets of contacts is coupled with the machines.

21. In an electric controller, a plurality of sets of contacts, one of said sets being in series-parallel arrangement a plurality of electric machines connected therewith, an equalizing connection as $g$ leading from the machines, in combination with means whereby the said equalizing-circuit is normally open-circuited, while the said series-parallel set of contacts is coupled with the machines.

22. In an electric controller, the combination of power and brake circuits extending therefrom, resistance included in the circuits, and a second resistance carried by the controller-cylinder and inserted in the circuit at a predetermined time.

23. In an electric controller, the combination of contacts and brushes for establishing various circuit relations of a dynamo-electric machine used for propelling and braking a vehicle, with a resistance carried by the actuating member of the controller and inserted in the brake side of the system.

24. In an electric controller, the combination of contacts and brushes for establishing various circuit relations of a dynamo-electric machine, resistance carried by the cylinder of the controller, connections between the contact-plates of the cylinder and the resistance, and brushes for inserting the resistance in the brake-circuit when desired.

25. In a controller for regulating a dynamo-electric machine, the combination of contacts for regulating the supply of energy to the machines when propelling a car, other contacts for regulating the supply of energy of the brake-magnets, and a resistance carried by the cylinder adapted to be included in one side of the system only.

26. In a controller for regulating dynamo-electric machines, the combination of a row of brushes, contacts on either side thereof, one set for controlling the machines when propelling a car, the second set for controlling the machine when supplying energy to the electric brakes, a resistance carried by the actuating member of the controller and inserted in the brake-circuit at predetermined intervals.

27. In a controller, the combination of a main or commutating switch, a reversing-switch, handles for operating the same, and means for operating the reversing-switch independent of the reversing-switch handle.

28. In a controller, the combination of main and reversing-switch cylinders, handles for operating them, and means actuated by a rotary movement of the main cylinder, for establishing a new circuit relation of the motors at the reversing-switch contacts.

29. In a controller, the combination of a main or commutating switch, a reversing-switch, handles for operating the same, and means actuated by the main cylinder for operating the reversing-switch independent of the operating-handle of the said switch.

30. In a controller, the combination of a main cylinder, a reversing-switch cylinder, handles for each of the cylinders, and means for rotating the reversing-switch cylinder independent of its switch-handle at an interval when the main circuit is broken.

31. In a controller for regulating dynamo-electric machines, used for propelling and braking a vehicle, the combination of a main cylinder, a reversing-switch cylinder operated by a suitable handle, means controlled by the main cylinder for rotating the reversing-switch cylinder independent of the switch-handle, at the interval between the breaking of the power-circuit and the establishing of the brake-circuit.

32. In a reversing-switch for a controller, the combination of a handle for operating the same, the handle regulating the direction in which the car will travel, and gearing for actuating the switch independent of the handle.

33. In a reversing-switch for a controller, the combination of a handle for operating the same, the handle regulating the direction in which the car will travel, gearing for operating the switch independent of the handle, and means controlled by the main cylinder for operating the gearing.

34. In a reversing-switch for a controller, the combination of a handle and segmental gear carried by the controller-cover, a cylinder provided with a circular rack, a bearing for the cylinder-shaft made in the hub of the gear, and an actuating member sleeved on the cylinder-shaft and carrying a pinion-gear to engage with the rack and segmental gear.

35. In an electric controller, the combination of main and reversing-switch cylinders, a handle for operating the reversing-switch, a segmental gear and arm operated by the handle, a rack mounted on the switch-cylinder, and a pinion-gear engaging with the segmental gear and the rack for operating the cylinder.

36. In a reversing-switch for a controller, the combination of a segmental gear and arm operated by a switch-handle, a rack on the switch-cylinder, a pinion-gear engaging with the segmental gear and rack, an arm pivoted on the shaft of the cylinder for operating the pinion, and means for operating the arm carried by the main cylinder.

37. In an electric controller, the combination of a main cylinder adapted to reciprocate to and fro from the off position, a reversing-switch, an operating-handle outside of the controller-case, and an operating device inside of the case for a further actuation of the reversing-switch.

38. In an electric controller, the combination of main and reversing-switch cylinders, a handle for the reversing-switch for establishing connections which regulate the direction in which the car will travel, and a lever operated by the main cylinder for again reversing the relation of the field and armature of the motor.

39. In an electric controller, the combination of main and reversing-switch cylinders, rows of contacts mounted on the reversing-switch, a handle for adjusting the reversing-switch, and means controlled by the main cylinder for oscillating two rows of contacts into and out of engagement with the stationary brushes.

40. In a controller, the combination of a main cylinder actuated by a handle, a reversing-switch cylinder controlled by a handle, a segmental gear having an arm extending therefrom and formed integral with the main shaft of the switch, and a device on the end of the arm for preventing the movement of the switch except in a predetermined position of the main cylinder.

41. In an electric controller, the combination of main and reversing-switch cylinders, a plurality of contacts on the reversing-switch cylinder, brushes engaging therewith, means for determining with which contacts the brushes shall engage, and means independent of the reversing-switch handle, for shifting the connections of the brushes from one to another of the sets of contacts on the cylinder.

42. In an electric controller, the combination of main and reversing-switch cylinders, separate means for insuring a step-by-step movement of each of the cylinders, and a common spring for the said means.

43. In an electric controller, the combination of a plurality of switch-cylinders, a pawl for each cylinder to regulate its step-by-step movement, and a common spring for the pawls permitting their independent or simultaneous operation.

44. In an electric controller, the combination of contacts for regulating the supply of energy to the motors, contacts for regulating the supply of energy to the brake-magnets, certain of the latter-mentioned contacts weakening one of the motors.

45. In an electric controller, the combination of contacts for regulating the supply of energy to the motors, contacts for regulating the supply of energy to the brake-magnets, certain of the contacts on the brake side affecting only one motor, and contacts on the power side affecting both motors.

46. In an electric controller, the combination of contacts for regulating the supply of energy to the motors and the brake-magnets, contacts for weakening the field of one of the motors when they are used for braking the car, and other contacts for weakening the field of both motors when it is desirable to increase the speed of the car.

ELMER A. SPERRY.

Witnesses:
S. BRASHEARS, Jr.,
E. G. BRASHEARS.